(12) United States Patent
Haaskjold Inderhaug

(10) Patent No.: US 11,650,174 B2
(45) Date of Patent: May 16, 2023

(54) IMPEDANCE LAYER ESTIMATION

(71) Applicant: Roxar Flow Measurement AS, Stavanger (NO)

(72) Inventor: Jonas Haaskjold Inderhaug, Bergen (NO)

(*) Notice: Subject to any disclaimer, the term of this patent is extended or adjusted under 35 U.S.C. 154(b) by 167 days.

(21) Appl. No.: 17/311,570

(22) PCT Filed: Feb. 12, 2020

(86) PCT No.: PCT/EP2020/053612
§ 371 (c)(1),
(2) Date: Jun. 7, 2021

(87) PCT Pub. No.: WO2020/165258
PCT Pub. Date: Aug. 20, 2020

(65) Prior Publication Data
US 2022/0026382 A1    Jan. 27, 2022

(30) Foreign Application Priority Data

Feb. 14, 2019  (NO) .................................. 20190208

(51) Int. Cl.
*G01N 27/04* (2006.01)
*G01N 27/02* (2006.01)
(Continued)

(52) U.S. Cl.
CPC .............. *G01N 27/04* (2013.01); *G01N 27/02* (2013.01); *G01F 1/58* (2013.01); *G01F 1/74* (2013.01)

(58) Field of Classification Search
CPC .......... G01N 27/02; G01N 27/04; G01F 1/74; G01F 1/58; G01R 27/16; G01R 17/105
See application file for complete search history.

(56) References Cited

U.S. PATENT DOCUMENTS 9,989,453 B2 * 6/2018 Kersey ................... G01N 17/02
2009/0205439 A1   8/2009 Hencken et al.
(Continued)

FOREIGN PATENT DOCUMENTS

NO            307393 B1    3/2000
NO            340852 B1    6/2017
WO    WO-2015055767 A1    4/2015

OTHER PUBLICATIONS

Ruchaud, Nicolas; International Search Report; PCT/EP2020/053612; dated Jul. 13, 2020; 5 pages.
(Continued)

*Primary Examiner* — Alexander Lagor
*Assistant Examiner* — James Split
(74) *Attorney, Agent, or Firm* — Bradley Arant Boult Cummings

(57) ABSTRACT

The invention relates to a method and system for estimating layers on electrodes in an annular, circular symmetric, multiphase pipe flow the pipe including a set of electrodes being evenly distributed along the inner pipe circumference. The method comprises the steps of measuring the impedance between each electrode and the other electrodes and obtaining a set of impedance values, the impedance values being categorized depending on the distance between the measuring electrodes, the impedance categories thus representing layers ranging from close to the pipe wall to the pipe center. The method also includes a precomputed model of a range of expected impedance values in the annular, circular symmetric fluid flow based on known fluid properties. The categorized impedance values are compared with the precomputed range of the annular, circular symmetric flow impedance values, and the impedances of said layers on said electrodes that, when combined with the measured imped-
(Continued)

ances, place the resulting impedances within the boundary of the pre-computed impedance range, are found.

16 Claims, 2 Drawing Sheets

(51) Int. Cl.
  *G01F 1/58* (2006.01)
  *G01F 1/74* (2006.01)

(56) References Cited

U.S. PATENT DOCUMENTS

2012/0036941 A1  2/2012  Drahm et al.
2015/0355126 A1* 12/2015  Voutilainen .......... G01N 27/226
                                                        324/671
2017/0350836 A1  12/2017  Nissinen et al.

OTHER PUBLICATIONS

Nissinen, A., et al.; "Compensation of errors due to discretization, domain truncation and unknown contact impedances in electrical impedance tomography"; Meas. Sci. Technol. 20; dated Sep. 16, 2009; 13 pages.

Vilhunen, T., et al.; "Simultaneous reconstruction of electrode contact impedances and internal electrical properties: I. Theory"; Meas. Sci. Technol. 13; dated Nov. 1, 2002; pp. 1848-1854.

* cited by examiner

IMPEDANCE LAYER ESTIMATION

This invention relates to the use of impedance measurements to estimate layers on electrodes in a pipe wall, the pipe conducting an essentially annular flow.

For measuring flow composition in pipes, electrodes are used, being positioned on the inner surface of the pipe, where the electrodes are connected to instruments measuring the impedance, e.g. capacitance or resistance, in the flow between the electrodes. Examples of such arrangements are shown in NO307393 and NO340852, having four electrodes distributed along the inner circumference of the pipe wall for measuring impedance in the pipe.

A problem occurring in the measurements is the deposition of resistive layers on the electrodes made up of wax and scaling that get stuck on the electrodes after use. This changes the measured impedance and to provide a measure of the fluid flow the influence from the layer has to be found. Systems for detecting scale and deposits in pipes are known, as discussed in WO2015055767, but for impedance measurements it is important to find the direct influence of the resistive layer on the measurements.

Another solution is described in US2009/205439 where the measured data is compared to previous data and a deviation from the historic data is reported as a layer at the electrodes. This, however, requires low natural variations in the flow measurements and is not suitable for complex flow regimes.

The object of the present invention is thus to provide a method and system for providing a measure of the layer impedance, i.e. resistivity or capacitance, in a pipe containing a multiphase fluid flow. This is obtained as specified in the accompanying claims.

The present invention therefore assumes that the flow on average is circular symmetric and annular, as expected in a vertical pipe. According to the invention a reliable and stable method is provided that works even in worst case scenarios where layers are inhomogeneous and water fraction is high over a long time.

The basis of the present method will be discussed below. The method is described relating to resistance measurements, but similar discussions may be made regarding capacitive measurements.

The present invention will be discussed more in detail below with reference to the accompanying drawings, illustrating the invention by way of examples.

Figure 3:
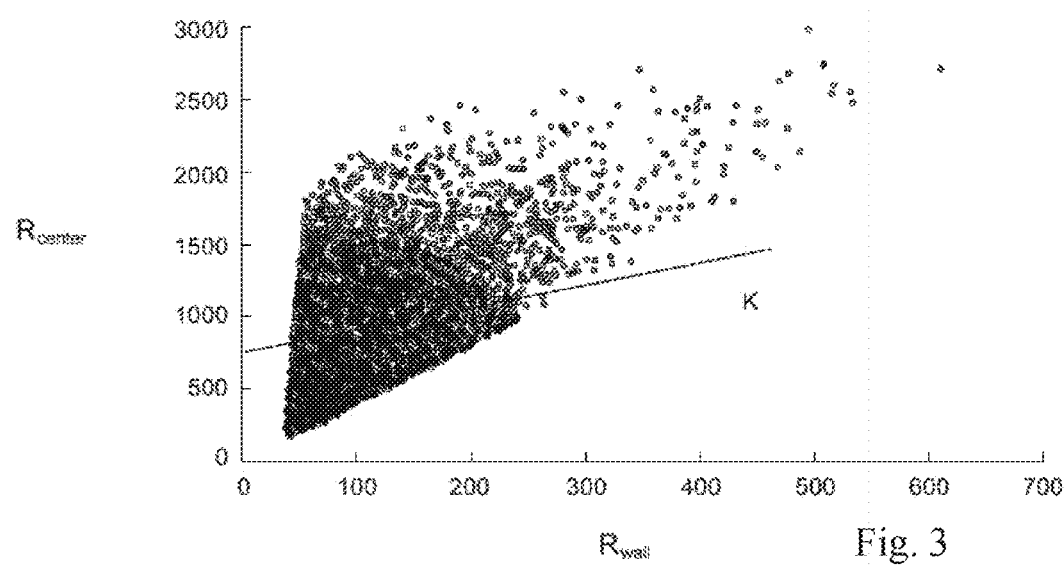

FIG. 3 The range of $R^{flow}(a,b,c)$. The x and y axes (z axis is not visible because of 2D) are the resistance of the center and the wall as computed by neural network, each point corresponds to some a,b,c. The line seen shows how changing k one moves the solution across the allowed region.

Figure 4:
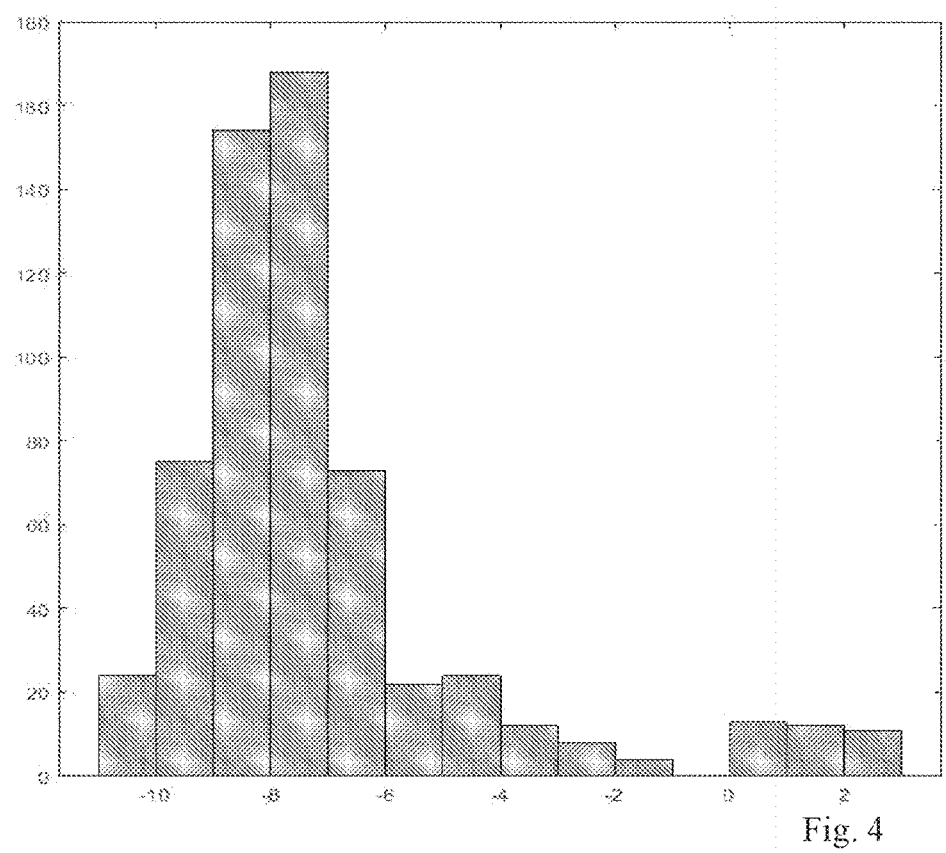

FIG. 4 Histogram of absolute error in layers in Ohms. The layers took random values between 0-800 Ohms, we see the error is less than 1.6%.

Figure 1:
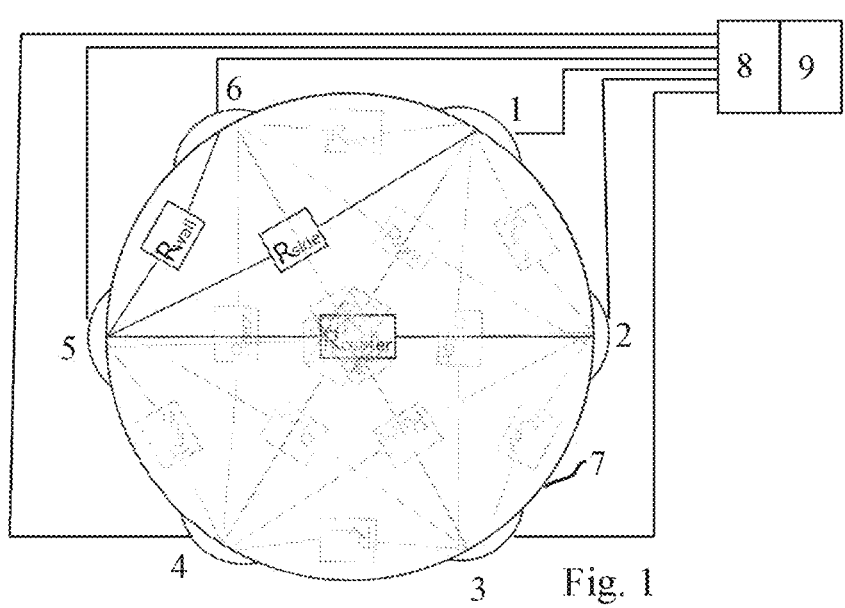
FIG. 1 illustrates the cross section of the electrode configurations used according to the preferred embodiment of the invention.

As illustrated in FIG. 1 the description below is based on a 6-electrode configuration in the inner wall of a pipe. Ground is ignored for this discussion but may easily be included, as would be understood by a person skilled in the art.

As can be seen the electrodes 1-6 are distributed evenly around the circumference of the pipe and therefore the distances between neighboring electrodes 1-2, 2-3, 3-4, 4-5, 5-6 and 6-1 are the same, as well as the distances between second neighbors 1-3, 2-4, 3-5, 4-6, 5-1 and 6-2, and the distances across the flow 1-4, 2-5 and 3-6. Although the present invention will be described with 6 electrodes similar results may be obtained with other numbers being evenly distributed over the inner pipe wall 7. Each electrode 1-6 is connected to a measuring instrument 8 adapted to measure the impedance between the electrodes and a computer 9 including a suitable computer program and adapted to compare and analyze the measurements as will be discussed below.

Activating the different electrode pairs separately the impedance between the pairs may be measured individually. Also, assuming a circular symmetric, annular flow the first neighbor pairs are expected to measure the same impedance, $R_{wall}$, the second neighbors measure the same impedance at the side of the flow, $R_{side}$, and the electrodes on opposite sides across the flow measures the impedance through the flow center. In this case three layers of impedance values are measured at different distances from the wall, $R_{wall}$, $R_{side}$, $R_{center}$. By using other numbers of electrodes the numbers of layers will vary accordingly.

The basics of the present invention is described in the following based in the illustrated six electrodes.

The electrodes labeled 1 to 6 may be included in the following equations:

$$I_i = \sigma_{j=1}^{6} I_{ij}^{pair} \qquad \text{(Kirchhoff's law)}$$

$$I_{ij}^{pair} = (U_i - U_j)/R_{ij} \qquad \text{(Ohm's law)}$$

The first equation is Kirchhoff's law which says that current is conserved which means that the total current through the electrode labelled i, namely $I_i$, is equal to the sum of the individual currents from each of the other electrodes $I_{ij}$. The second equation is Ohm's law on each electrode pair. Plugging the second equation into the first we can eliminate all $I_{ij}^{pair}$.

The basic idea is to excite the electrodes with voltages enough times and measure the currents simultaneously enough times so that one could solve the above equations for $R_{ij}$. For six electrodes (plus ground rings), six excitations are needed. It is well within today's technology to perform these excitations before the flow changes providing an instantaneous image of the flow conditions at a certain time, but the momentary flow conditions are essentially chaotic and not necessarily circular symmetric or annular. In order to provide a reliable measurement of the layer on the electrodes a time average of the impedance is preferable.

The averaging should be over a sufficient amount to time to even out the local turbulent behavior of the flow, e.g. more than 2 seconds, to provide essentially symmetric measurements, but not so long that the layers on the electrodes changes significantly. The latter being in the range of hours or more. The averaging can be over a continuous time sequence or in a sequential sampling.

The 6×6 Matrix $R_{ij}$ is called the Voltage-to-Current map and gives us the complete knowledge of the flow that is possible.

Since i and j goes from 1 to 6, we should have 36 different $R_{ij}$, but since $R_{ij}=R_{ji}$ and $R_{ii}$ is not defined, there are only 15 independent $R_{ij}$. We rearrange these 15 resistances into a vector and call the measured resistances $R_i^G$ where i now runs from 1 to 15.

For ground ring it is known that its potential is 0 and the total current is zero, so we know its current too, so it can be treated just like a seventh electrode. When we have circularly symmetric conductivity distribution there is only three independent resistances.

In capacitive mode the system is governed by the same equation (Poisson's equation) but using permittivity instead of conductivity.

Instead of U=RI we have U=(1/C)Q, so the R matrix is simply replaced by a matrix which is completely analogous but using the numbers 1/C. The physics is the same with conductivity replaced by permittivity and resistance by reciprocal of the capacitance. To find the 1/C matrix we use the same method as above. As with the permittivity, like conductivity, the capacitance is on average also annular, so the method should work just as well to find the capacitive layers.

Referring to FIG. 1 the layers are designated by a vector of 6 elements, $L_n$, which is the resistive layer fixed on the nth electrode. We have the equation $$R_{ij}^{measured} = R_{ij}^{flow} \leqslant L_i + L_j \qquad \text{(eq 1)}.$$

We then formally take the mean of both sides of the equation over the whole period we measured, then the matrix $R^{flow}$ only contains three different values.

This is because the average of the flow resistance between neighboring electrodes should become the same due to the circular symmetry of the pipe, and the same for second neighbors and third neighbors. As the mean of the layers do not change, the number of unknowns has been reduced from 15+6 to 3+6.

Although 15 equations are available (one for each element of the matrix) this system is not solvable. It can be shown that if there is one solution set $\{L, R^{flow}\}$, another solution set $\{L-k, R^{flow}+2k\}$, can be found for any k.

$$R_{ij}^{measured} = R_{ij}^{flow} + L_i + L_j = (r_{ij}^{flow} + 2k) + (L_i - k) + (L_j - k) \qquad \text{(eq. 2)}.$$

This, however, means that there is only one variable left, k, hereon called the level, who's computation is described below.

The basis of the method is that for a given $R^{flow}$ matrix, there is correspondence $R^{flow} \leqslant \sigma(x)$, where $\sigma(x)$, is the conductivity distribution. One can go from left to right by tomography, and from right to left by finite elements (FEM) methods such as provided by COMSOL or real experiments. One of the fundamental insights of this method is that it is possible to take the "average" of both sides, to get an approximate correspondence. This means that the mean values of the left sides for some period of the flow are found, and then a tomography taken it is possible to get a conductivity distribution which corresponds to the average of the conductivity for that flow. This is not exactly true mathematically, but will provide the necessary two features, it is circular symmetric ($\sigma(x)$ depends only on r)

it is annular, that is $\sigma(r)$ increases as r (radius away from center) increases.

Since the meter is cylindrically symmetric, and gas is pulled to the center, these assumptions are considered to hold.

Possible values for $R^{flow}$

Figure 2:
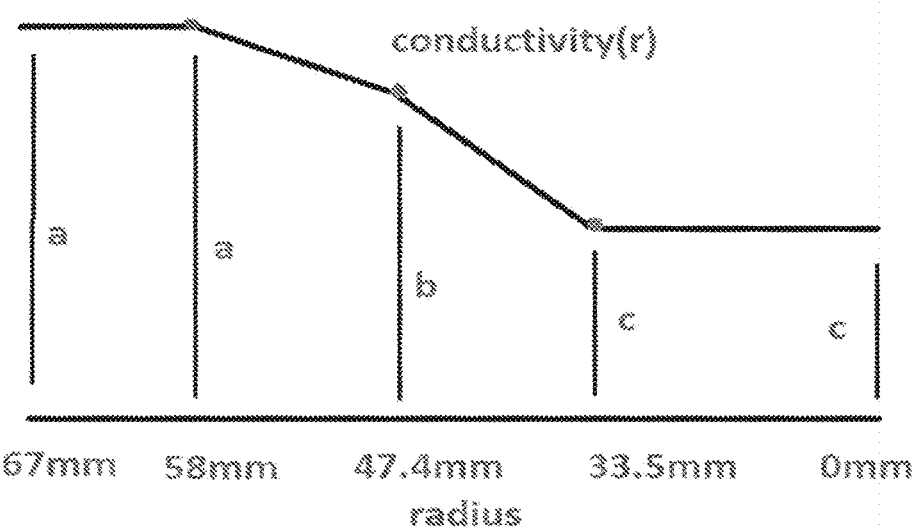
FIG. 2 shows the radial distribution of the conductivity in a fluid flow parametrized by a,b and c.

With these two constraints, only a specific subset of all possible $R^{flow}$ is possible. To find this subset a one-time precomputation is performed, e.g. using COMSOL or similar simulation tools. As far as possible all annular circular symmetric conductivity distributions are simulated and the three R values: for neighboring electrodes, $R_{wall}$, 2nd neighboring, $R_{side}$ and third neighboring, $R_{center}$, are all calculated in the six electrode configuration. The distributions can be produced by any means that span out the space of annular circular symmetric distributions. In our case we parametrized them by three values a,b,c (see FIG. 2) where a goes from 0.05 to 1, b from 0.05 to a, and c from 0.05 to b. This resulted in 1540 simulations.

A neural network may then be trained to obtain $R^{flow}(a,b,c)$ These functions should provide a good span of the space of realistic annular conductivity distributions, but the method can be improved by adding more parameters as well as computation time.

A space may then be generated by $R^{flow}$ representing the flow being circular symmetric and annular. We just plug in random a, b, c for 1000000 values, the result is shown in FIG. 3.

FIG. 3 illustrates the range of $R^{flow}(a,b,c)$. The x and y axes (z axis is not visible in the 2D representation) are the resistance of the center and the wall as computed by our neural network. Each point corresponds to some a,b,c. We see that the space in the figure is quite convex. Thus a model comprising possible flow characteristics has been obtained.

It is then possible to construct a function f(R) which takes in in $R_{wall}$, $R_{side}$ and $R_{center}$ and which checks whether R lies within the shown region of FIG. 3, and thus whether there is a circular and annular conductivity distribution with these R values. This is essentially based on checking whether a point is in a well-defined region of 3D space. This is a standard mathematical exercise well known to the person skilled in the art.

The tools are now available for solving for the layer. This involves finding some $L_n$ which solves equation 1. We are left with level k as a variable. From $L_n$ we form the matrix $M_{ij} = L_i + L_j$. Equation 1 is then recast as follows.

$$\text{mean}(R^{measured}) - M(L_n) = R^{flow} \qquad \text{(eq. 3)}$$

The next step is to add various ks to the layers, and check with the constructed function $f(R^{flow})$ whether the resistance on the right side of eq. 3 is inside the allowed area. This provides upper and lower bounds on k. With bounds on k it is possible to set bounds on the layers. By taking a new time series, a new average is provided as well as other upper and lower bounds on the layers. The maximum of the set of upper bounds and minimum of the set of lower bounds gives very good results for the layer, as will be seen below. (See results section.)

In practical application a long time series $R^{measured}(t_n)$ is used to find the layers. To use this method most efficiently, many different averages is preferably formed by composing non-sequential $R^{measured}(t_n)$ in different ways to get averages that lies close to the edge of the convex hull, so that k is constrained the most. The method is then applied to each of them to get many different upper and lower bounds.

More in detail, the layers are found in the following way, still based on a 6 electrode configuration.

At each timestep there are 15 equations (since there are 15 pairs of electrodes)

$$R_{ij}^{measured} = R_{ij}^{flow} + L_i + L_j.$$

$R_{ij}^{flow}$ is the real resistance of the flow, between electrode i and j. $L_i$ is the resistance of the layer on electrode i. Each measured resistance is the series of two layer-resistances and a flow resistance.

There are 6 different $L_i$, one for each electrode, and 15 $R_{ij}^{flow}$. Everything on the right is unknown, and the left is what is measured. Thus there are 21 unknowns and 15 equations. As mentioned above the mean of everything in this equation is calculated over a timeseries to obtain the following equation.

$$\text{mean}(r_{ij}^{measured}) = \text{mean}(R_{ij}^{flow} + L_i + L_j) = \text{mean}(R_{ij}^{flow}) + L_i + L_j.$$

Since the layer is not expected to change on these time scales, L can be taken outside the average operation. Due to the circular symmetry of averaged vertical flow, mean $(R_{13}^{flow})$=mean$(R_{35}^{flow})$ etc., and the 15 different flow resistances turn into only three left in mean$(R_{ij}^{flow})$, being called $R_{wall}$, $R_{center}$ and $R_{side}$.

This results in 3+6=9 unknowns and 15 equations, but as discussed above this is not solvable for the following reason.

If $L_i$=X, and mean$(R_{ij}^{flow})$=Y solves this equation, where X and Y are vectors, then X−k and Y+2k (where we add the same to each element) will also solve this equation, no matter what k is:

$$R_{ij}^{measured}=R_{ij}^{flow}+L_i+L_j=(R_{ij}^{flow}-2k)+(L_i+k)+(L_j+k).$$

Explained more physically: There is no easy way to distinguish between a symmetrical layer and a symmetrical flow.

Therefore, there is a need to find a method for finding k. Starting with setting $L_1$=0, then this equation can be solved easily, as it is just a linear set of equation.

This leaves a value for L which solves the equation, and the real physical L is this vector plus some constant k. The equation may then be solved to get some solution for these three resistances, where the real physical values of these is obtained by subtracting some constant 2k.

As it is known that the flow is circularly symmetric and annular on average, there are some constrains on the flow resistances [$R_{wall}$, $R_{center}$, $R_{side}$]. This may be used to constrain the possible values of 2k which can be added to the initial solution. If 2k is too big or too small, the flow resistances will become unphysical. A constrained k leads directly to constrained layer resistances, L.

Using known models, it is possible to calculate in which range the physically possible flow resistances are, by doing simulations with commercially available programs such as COMSOL. By simulating a wide range of circular and annular scenarios (without layers), all reasonable results may be spanned.

Plotting the resulting physically possible [$R_{wall}$, $R_{center}$, $R_{side}$], a limited portion of the "resistance space" may be defined, which, as discussed above, is illustrated in FIG. 3.

Since this region has a quite well-defined boundary (two straight lines), and is densely filled, it is expected that any annular distribution will fall within this region. Conversely, we assume that all points within this region correspond to annular distributions.

Our general solution, [$R_{wall}$, $R_{center}$, $R_{side}$]+2k, as illustrated by the line in FIG. 3, intersects the "annular" area of the solution space. Since we expect the real solution to be annular, we limit k to values that place the solution inside the annular area. Through eq. 2, this translates into an upper and lower bound on the layer resistances, $L_i$.

Now when we get more time-series we do the same and get other upper and lower bounds on the layers and we take the minimum of all the upper bounds and the maximum of all the lower bounds and take the average of the two to get a good estimate on the layers.

The method according to the invention was tested as follows: Using a dataset of 3000 R matrices for 3000 random flow configurations computed. These were generated by dividing the meter into 13 regions of equal area, and each were given a random conductivity. The conductivity distribution was slightly biased to have an expected annular distribution, but it was not always annular of course. With 100 random configurations from this set, since this is not quite enough to get circular symmetric distribution. Therefore, this set was adjoined with the 5 conductivity configurations rotated 60*n degrees around the flow-axis, n=1,2,3,4,5. Now the average of this set is circular symmetric, and the method was tested on this average. A uniformly random layer of 1-800 Ohm was added to each electrode and these values added in appropriate manner to this R matrix, this giving the matrix $R^{measured}$ with which the method was to be tested. 8 averages and the min and max of the upper and lower bounds were taken. This was done 100 times and the results are shown in FIG. 4, showing a histogram of absolute error in layers in Ohms. The layers took random values between 0-800 Ohms, we see the error is less than 1.6%.

The results as illustrated in FIG. 4 are already good, but further improvements may be made by taking the average of the largest R values and the smallest to get two different averages that lies on opposite sides of the convex hull, thus constraining the level the most. In this test only 8 averages were used. In real life this is just a couple of seconds, and if it runs longer the layer accuracy may be improved accordingly. Thus, the method according to the invention will reliably detect layers with high accuracy in difficult flow scenarios.

To summarize the present invention relates to a method and system for estimating layers on electrodes in a pipe. The pipe containing an annular, circular symmetric, multiphase pipe flow. The pipe include a set of electrodes being evenly distributed along the inner pipe circumference, preferably for measuring the impedance in the pipe. This is performed by measuring the impedance between each electrode and the other electrodes obtaining a set of impedance values. The impedance values are categorized depending on the distance between the measuring electrodes, the impedance categories ($R_{wall}$, $R_{center}$, $R_{side}$) thus representing layers ranging from close to the pipe wall to the pipe center.

The method also includes providing a precomputed model stored in a computer storage, the precomputed model including of a range of expected impedance values in the annular, circular symmetric fluid flow based on known fluid properties of the fluids expected to be present in the pipe.

The precomputed range of values are compared in a suitable computer program in said computer with the categorized impedance values based on the measurements from the annular, circular symmetric flow and from this comparison finding the impedance of said layer or layers L on said electrodes that, when combined with an average of the measured impedances $R^{measured}$ over a chosen period places the resulting averaged impedances within the boundary of the pre-calculated impedance range $R^{flow}$ of possible impedance values in the fluid flow, thus representing the expected impedance value range. This difference may be calculated as discussed above using the offset value k between the measured values and the allowed, expected values.

As illustrated the number of electrodes may be six, the number of impedance value categories representing the flow being three, but other constellations may be contemplated e.g. for providing more layers.

The measurements, comparison and calculation of the offset value is preferably repeated in a time series, assuming that the layer changes more slowly than the flow, increasing the accuracy of the calculated impedance of the layer.

The measurements may be averaged over at least one time sequence over a chosen period of time. Preferably more than 2 seconds for a multiphase flow so as to even out turbulence and chaotic behavior.

The method may include finding the the impedances of said layers to be within a range between an upper and a lower bound and calculating the upper and lower bounds of the electrode layer impedance, finding an estimate of the layer impedances from these upper and lower bounds. It may also include calculating the layer impedances from the maximum of the set of lower bounds and the minimum of the set of upper bounds, the average between them providing an estimate of the layer impedance.

The invention claimed is:

1. A method for estimating the impedances of layers ($L_i$, $L_j$) on electrodes in a multiphase pipe flow through a pipe, the pipe including a set of electrodes (i, j) evenly distributed along the inner circumference of the pipe, the method comprising:

measuring the impedance between each electrode and the other electrodes;

obtaining a set of impedance values $R_{ij}^{measured}$, the flow in average being annular and circular symmetric; and using a precomputed model stored in a computer storage, the precomputed model defining a solution space $R_{ij}^{flow}$ of expected impedance values and for which conductivity σ depends only on r and increases as r increases, r being the radius away from the center of the flow, wherein $$R_{ij}^{measured} = R_{ij}^{flow} + L_i + L_j = (R_{ij}^{flow} - 2k) + (L_i + k) + (L_j + k), \quad \text{(equation 2)}$$

k being a variable and the impedances $R_{ij}^{flow}$ being categorized depending on the distance between the measuring electrodes (i, j) in order to reduce the number of unknowns in the equation 2, finding impedances of the layers ($L_i$, $L_j$) on the electrodes and adding various k to the impedances of the layers ($L_i$, $L_j$) such that the impedances of the layers ($L_i$, $L_j$) combined with an average of the measured impedances over a chosen period place the resulting averaged impedances within the boundary of the pre-computed solution space $F_{ij}^{flow}$, representing the expected impedance value range.

2. The method according to claim 1, wherein the number of electrodes is 6, and the number of impedance value categories representing the flow is 3.

3. The method according to claim 1, wherein the measurements are repeated in a time series, assuming that the layers change more slowly than the flow, increasing the accuracy of the calculated impedances of the layers.

4. The method according to claim 1, wherein the measurements are averaged over a number of chosen time sequences.

5. The method according to claim 4, wherein the averaging is performed over at least 2 seconds.

6. The method according to claim 1, wherein the impedances of the layers on the electrodes are found to be within a range between an upper and a lower bound.

7. The method according to claim 6, including calculating upper and lower bounds of the electrode layer impedances, and finding an estimate of the layer impedances from these upper and lower bounds.

8. The method according to claim 7, including calculating the layer impedances from the maximum of the set of lower bounds and the minimum of the set of upper bounds, the average between said maximum and said minimum providing an estimate of the layer impedances.

9. A system for estimating the impedances of layers ($L_i$, $L_j$) on electrodes in an annular, circular symmetric, multiphase pipe flow, the system comprising a pipe including a set of electrodes (i, j) evenly distributed along the inner circumference of the pipe, the electrodes being connected to a measuring instrument for measuring the impedance between each electrode and the other electrodes and obtaining a set of impedance values $R_{ij}^{measured}$, the flow in average being annular and circular symmetric, the system also including a computer with a computer storage including a precomputed model defining a solution space $R_{ij}^{flow}$ of expected impedance values and for which conductivity σ depends only on r and increases as r increases, r being the radius away from the center of the flow, wherein $$R_{ij}^{measured} = R_{ij}^{flow} + L_i + L_j = (R_{ij}^{flow} - 2k) + (L_i + k) + (L_j + k), \quad \text{(equation 2)}$$

k being a variable and the impedances $F_{ij}^{flow}$ being categorized depending on the distance between the measuring electrodes (i, j) in order to reduce the number of unknowns in equation 2, the system further being configured to find impedances of the layers ($L_i$, $L_j$) on the electrodes and add various k to the impedances of the layers ($L_i$, $L_j$) such that the impedances of the layers ($L_i$, $L_j$) combined with an average of the measured impedances over a chosen period places the resulting averaged impedances within the boundary of the pre-computed solution space $R_{ij}^{flow}$, representing the expected impedance value range.

10. The system according to claim 9, wherein the number of electrodes is 6, and the number of impedance value categories representing the flow is 3.

11. The system according to claim 9, wherein the measuring instrument is adapted to perform the measurements, repeated in a time series, assuming that the layers change more slowly than the flow, increasing the accuracy of the calculated impedances of the layers.

12. The system according to claim 9, wherein the measuring instrument is adapted to average measurements over a number of chosen time sequences.

13. The system according to claim 12, wherein the averaging is performed over at least 2 seconds.

14. The system according to claim 9, wherein the impedances of the layers on the electrodes are found to be within a range between an upper and a lower bound.

15. The system according to claim 14, the system further being configured to calculate upper and lower bounds of the electrode layer impedances, and find an estimate of the layer impedances from these upper and lower bounds.

16. The system according to claim 15, including calculating the layer impedances from the maximum of the set of lower bounds and the minimum of the set of upper bounds, the average between said maximum and said minimum providing an estimate of the layer impedances.

* * * * *

UNITED STATES PATENT AND TRADEMARK OFFICE
CERTIFICATE OF CORRECTION

| | |
|---|---|
| PATENT NO. | : 11,650,174 B2 |
| APPLICATION NO. | : 17/311570 |
| DATED | : May 16, 2023 |
| INVENTOR(S) | : Jonas Haaskjold Inderhaug |

It is certified that error appears in the above-identified patent and that said Letters Patent is hereby corrected as shown below:

In the Claims

Claim 1, Column 7, Lines 7-38:	Replace "1. A method for estimating the impedances of layers (Li, Lj) on electrodes in a multiphase pipe flow through a pipe, the pipe including a set of electrodes (i, j) evenly distributed along the inner circumference of the pipe, the method comprising:
measuring the impedance between each electrode and the other electrodes;
obtaining a set of impedance values R.sub.ij.sup.measured, the flow in average being annular and circular symmetric; and using a precomputed model stored in a computer storage, the precomputed model defining a solution space R.sub.ij.sup.flow of expected impedance values and for which conductivity σ depends only on r and increases as r increases, r being the radius away from the center of the flow, wherein
$R$.sub.$ij$.sup.measured=$R$.sub.$ij$.sup.flow+$L$.sub.$i$+$L$.sub.$j$=($R$.sub.$ij$.sup.flow-2$k$)+($L$.sub.$i$+$k$)+($L$.sub.$j$+$k$), (equation 2)
k being a variable and the impedances R.sub.ij.sup.flow being categorized depending on the distance between the measuring electrodes (i, j) in order to reduce the number of unknowns in the equation 2,
finding impedances of the layers (Li, Lj) on the electrodes and adding various k to the impedances of the layers (Li, Lj) such that the impedances of the layers (Li, Lj) combined with an average of the measured impedances over a chosen period place the resulting averaged impedances within the boundary of the pre-computed solution space F.sub.ij.sup.flow, representing the expected impedance value range." with Signed and Sealed this
Twenty-ninth Day of August, 2023

*Katherine Kelly Vidal*

Katherine Kelly Vidal
*Director of the United States Patent and Trademark Office*

--1. A method for estimating the impedances of layers ($L_i$, $L_j$) on electrodes in multiphase pipe flow, the pipe including a set of electrodes (i, j) being evenly distributed along the inner pipe circumference, the method comprising:
measuring the impedance between each electrode and the other electrodes;
obtaining a set of impedance values $R_{ij}^{measured}$, the flow in average being annular and circular symmetric;
wherein the method makes use of a precomputed model stored in a computer storage model defining a solution space $R_{ij}^{flow}$ of expected impedance values and for which the conductivity σ depends only on r and increases as r increases, r being the radius away from the center of the flow,
wherein $$R_{ij}^{measured} = R_{ij}^{flow} + L_i + L_j = (R_{ij}^{flow} - 2k) + (L_i + k) + (L_j + k),$$ (equation 2)

k, being a variable and the impedances $R_{ij}^{flow}$ being categorized depending on the distance between the measuring electrodes (i, j) in order to reduce the number of unknowns in the equation 2; and
finding impedances of the layers ($L_i$, $L_j$) on the electrodes and adding various k to the layers impedances ($L_i$, $L_j$) such that the impedances of the layers ($L_i$, $L_j$) combined with an average of the measured impedances over a chosen period place the resulting averaged impedances within the boundary of the pre-computed solution space $R_{ij}^{flow}$, representing the expected impedance value range.--

Claim 9, Column 8, Lines 3-34:

Replace "9. A system for estimating the impedances of layers ($L_i$, $L_j$) on electrodes in an annular, circular symmetric, multiphase pipe flow, the system comprising a pipe including a set of electrodes (i, j) evenly distributed along the inner circumference of the pipe, the electrodes being connected to a measuring instrument for measuring the impedance between each electrode and the other electrodes and obtaining a set of impedance values R.sub.ij.sup.measured, the flow in average being annular and circular symmetric,
the system also including a computer with a computer storage including a precomputed model defining a solution space R.sub.ij.sup.flow of expected impedance values and for which conductivity a depends only on r and increases as r increases, r being the radius away from the center of the flow, wherein
$R.sub.ij.sup.measured = R.sub.ij.sup.flow + L.sub.i + L.sub.j = (R.sub.ij.sup.flow - 2k) + (L.sub.i + k) + (L.sub.j + k)$, (equation 2)
k being a variable and the impedances F.sub.ij.sup.flow being categorized depending on the distance between the measuring electrodes (i, j) in order to reduce the number of unknowns in equation 2,
the system further being configured to find impedances of the layers (Li, Lj) on the electrodes and add various k to the impedances of the layers (Li, Lj) such that the impedances of the layers (Li, Lj) combined with an average of the measured impedances over a chosen period places the resulting averaged impedances within the boundary of the pre-computed solution space R.sub.ij.sup.flow, representing the expected impedance value range." with
--9. A system for estimating the impedances of layers (Li, Lj) on electrodes in an annular, circular symmetric, multiphase pipe flow, comprising a pipe including a set of electrodes (I, j) being evenly distributed along the inner pipe circumference, the electrodes being connected to measuring instrument for measuring the impedance between each electrode and the other electrodes obtaining a set of impedance value $R_{ij}^{measured}$, the flow in average being annular, circular symmetric,
the system also including a computer with a computer storage including a precomputed model defining a solution space $R_{ij}^{flow}$ of expected impedance values and for which the conductivity σ depends only on r and increases as r increases, r being the radius away from the center of the flow,
wherein
$$R_{ij}^{measured} = R_{ij}^{flow} + L_i + L_j = (R_{ij}^{flow} - 2k) + (L_i + k) + (L_j + k)$$, (equation 2)
k, being a variable and the impedances $R_{ij}^{flow}$ being categorized depending on the distance between the measuring electrodes (i, j) in order to reduce the number of unknowns in equation 2,
the system further being configured to finding impedances of the layers (Li, Lj) on the electrodes and adding various k to the layers' impedances (Li, Lj) such that the impedances of the layers (Li, Lj) combined with an average of the measured impedances over a chosen period places the resulting averaged impedances within the boundary of the precomputed solution space $R_{ij}^{flow}$, representing the expected impedance value range.--